United States Patent [19]
Curry

[11] Patent Number: 5,902,038
[45] Date of Patent: May 11, 1999

[54] LIGHTED BICYCLE PEDAL

[76] Inventor: Ernest L. Curry, 9306 NE. Woodridge St., Vancouver, Wash. 98664

[21] Appl. No.: 08/947,822

[22] Filed: Oct. 9, 1997

[51] Int. Cl.⁶ ..................................................... F21Q 1/00
[52] U.S. Cl. .......................... 362/473; 362/800; 362/802
[58] Field of Search .................................... 362/473, 800, 362/802

[56] References Cited

U.S. PATENT DOCUMENTS

| | | | |
|---|---|---|---|
| 2,185,600 | 1/1940 | McComb | 362/473 |
| 2,334,442 | 11/1943 | Salimbene | 362/473 |
| 2,732,540 | 1/1956 | MacMahon | 362/473 |
| 2,743,541 | 1/1956 | Macmahon | 362/473 |
| 3,764,976 | 10/1973 | MacMahon . | |
| 4,135,229 | 1/1979 | Modurkay . | |
| 4,176,390 | 11/1979 | Galbert | 362/473 |
| 4,860,177 | 8/1989 | Simms | 362/473 |
| 4,943,752 | 7/1990 | Todd et al. . | |
| 4,949,228 | 8/1990 | Lin et al. | 362/473 |
| 5,278,732 | 1/1994 | Frankum | 362/473 |
| 5,313,187 | 5/1994 | Choi et al. . | |
| 5,333,101 | 7/1994 | McEvoy | 362/473 |
| 5,624,175 | 4/1997 | Gelormino et al. | 362/473 |
| 5,662,405 | 9/1997 | Kuo | 362/473 |
| 5,667,290 | 9/1997 | Cioletti et al. | 362/802 X |
| 5,702,172 | 12/1997 | Kilburn | 362/473 |
| 5,800,039 | 9/1998 | Lee | 362/802 X |

*Primary Examiner*—Laura Tso
*Attorney, Agent, or Firm*—Robert D. Varitz, PC

[57] ABSTRACT

A lighted bicycle pedal includes a pedal frame, which has a hub and a pair of spaced-apart treads disposed on either side of the hub. The pedal frame is freely rotatable about the hub. A light source is mounted on the pedal frame and includes a light emitter, a flasher mechanism which is operable to cause the light emitter to flash on and off, and a time-out mechanism. A power supply is provided for the light source. A gravity activated switch is also provided and has an on position and an off position for connecting and disconnecting, respectively, the light source to the power supply.

10 Claims, 3 Drawing Sheets

LIGHTED BICYCLE PEDAL

FIELD OF THE INVENTION

This invention relates to bicycle safety equipment, and specifically to a pedal which is selectively lighted.

BACKGROUND OF THE INVENTION

As bicycles become a more popular form of transportation, particularly in the United States, a number of safety devices have been developed to provide the bicycle rider with enhanced visibility. A well-known device for providing such visibility is a flashing light which is generally worn on the cyclist's clothing, or fasten to the bicycle frame. Other devices, such as that shown in U.S. Pat. No. 4,135,229 to Modurkay, provides a flashing light which is fastened to a bicycle wheel.

A known form of lighted pedal is shown in U.S. Pat. No. 3,764,976 to MacMahon, which projects a light off of the sides of the pedal, perpendicular to the frame, and hence the motion, of the bicycle. Certainly, any number of circuits are known which provide a flashing mechanism for lights, as well as circuits which provide for a time-out mechanism, i.e., one that allows the circuit to operate for a predetermined amount of time once the circuit has been shut off.

Although the aforementioned devices are operable for their intended purposes, they still have a number of shortcomings which the instant invention seeks to overcome.

SUMMARY OF THE INVENTION

The lighted bicycle pedal of the invention includes a pedal frame, which has a hub and a pair of spaced-apart treads disposed on either side of the hub. The pedal frame is freely rotatable about the hub. A light source is mounted on the pedal frame and includes a light emitter, a flasher mechanism which is operable to cause the light emitter to flash on and off, and a time-out mechanism. A power supply is provided for the light source. A gravity activated switch is also provided and has an on position and an off position for connecting and disconnecting, respectively, the light source to the power supply.

It is an object of the invention to provide a lighted safety device for a bicycle.

Another object of the invention is to provide a lighted bicycle pedal which may be powered for a long period of time without the need to replace batteries in a power supply.

Yet another object of the invention is to provide a lighted bicycle pedal which will automatically begin operation when the bicycle is placed in motion.

Still another object of the invention is to provide a lighted bicycle pedal which will automatically shut off within a predetermined amount of time after the bicycle stops.

These and other objects and advantages of the invention will become more fully apparent as the description which follows is read in conjunction with the drawings.

DETAILED DESCRIPTION OF THE PREFERRED EMBODIMENT

Figure 1:
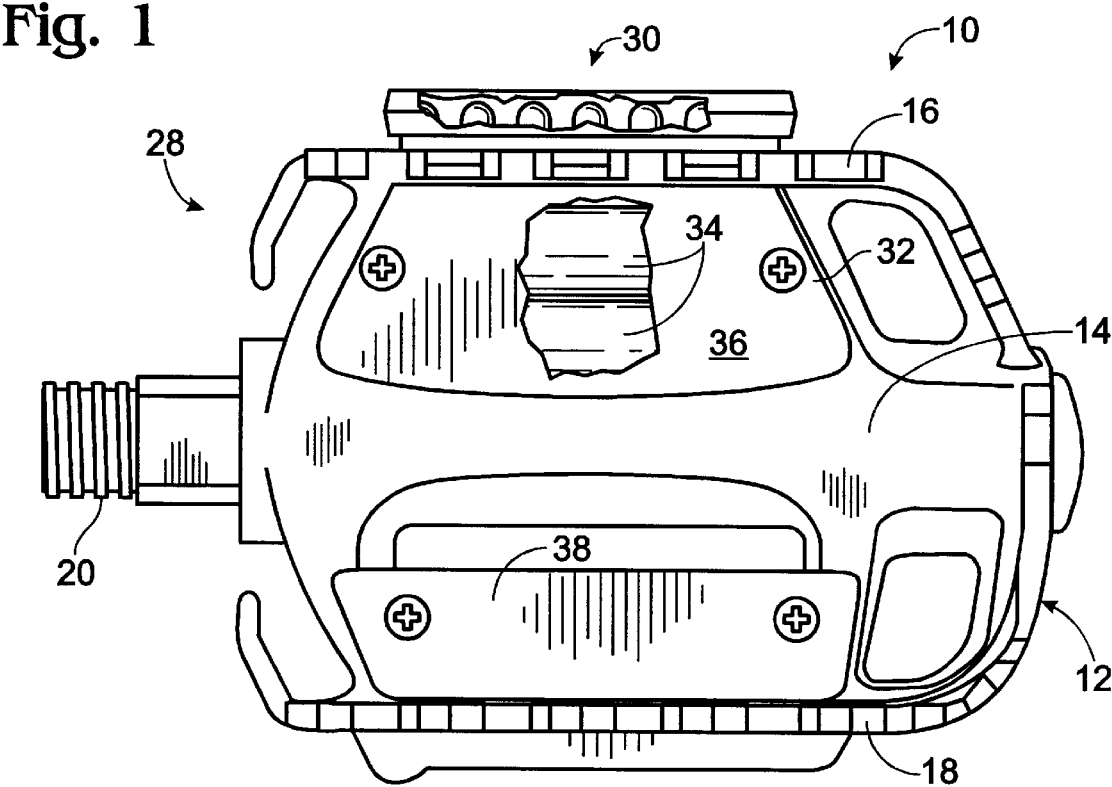
FIG. 1 is a top plan view of the lighted bicycle pedal of the invention.

Referring now to FIG. 1, the lighted bicycle pedal of the invention is depicted generally at 10. Pedal 10 includes a pedal frame, shown generally at 12, which includes a hub 14, a first tread 16, and a second tread 18. Hub 14 includes a threaded, rotatable member 20, which is received in a conformably threaded opening in a pedal crank on a bicycle (not shown). Threaded member 20 is freely rotatable within hub 14 and provides that pedal frame 12 is also freely rotatable about hub 14. Treads 16 and 18 are spaced-apart from one another and are disposed on either side of hub 14.

A lighting mechanism 28 is located on pedal frame 12. Lighting mechanism 28 includes a light emitter, shown generally at 30, which in the preferred embodiment, takes the form of LEDs, in this case, five LEDs, which are disposed across the expanse of one tread 16, also referred to herein as a first tread. In the preferred embodiment, the LEDs are known as "Super Bright" LEDs, model no. AND180HRP, manufactured by Toshiba, Inc.

A power supply 32 is also located adjacent to first tread 16, and, in the preferred embodiment, takes the form of a pair of AA dry cell batteries 34. Batteries 34 are received in a case 36, one end of which may be opened to remove and replace batteries 34.

Figure 3:
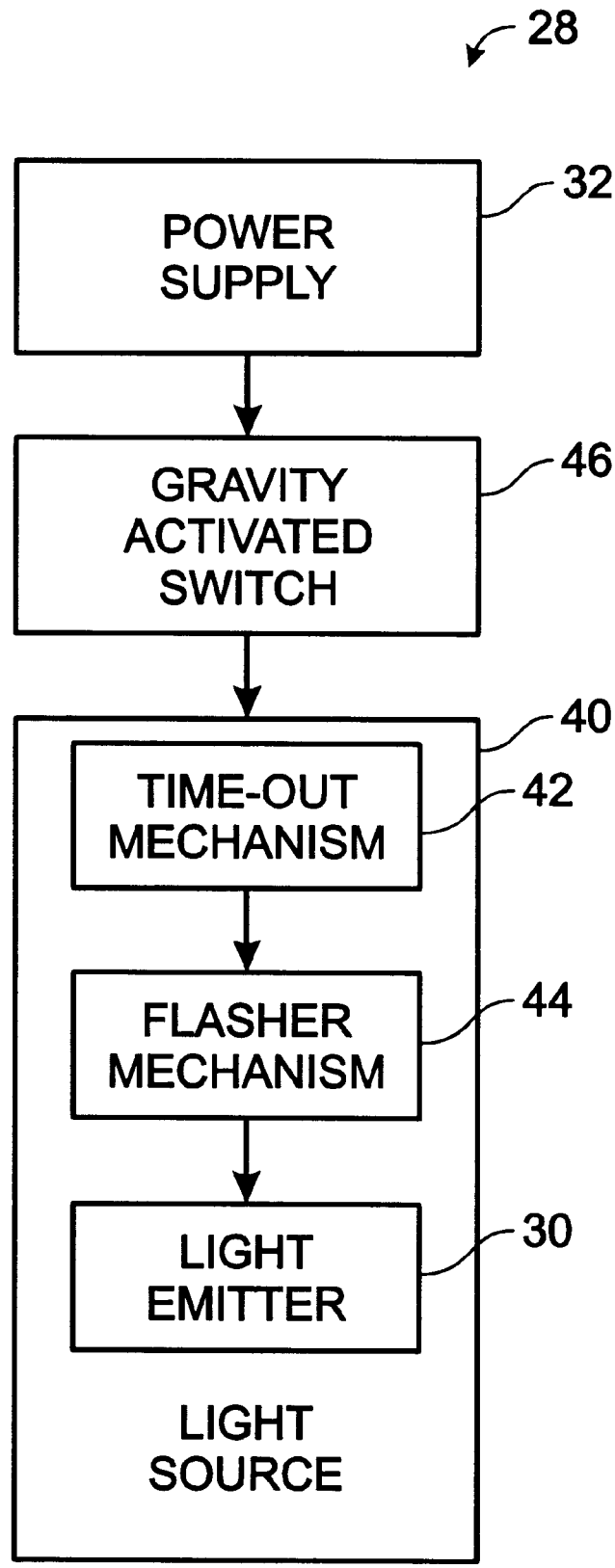
FIG. 3 is a block diagram of the lighting mechanism of the invention.

A circuit board 38 is located adjacent the other, or second tread 18 in the preferred embodiment. Referring now to FIG. 3, other components lighting mechanism components include a light source 40, which includes light emitter 30. A time-out mechanism 42 and a flasher mechanism 44 are located on circuit board 38. A gravity activated switch 46, which connects power supply 32 to light source 40 is also located on circuit board 38. In the preferred embodiment, switch 46 is a non-mercury tilt switch, such as that manufactured by Comus, and sold under model number CW1600-0. It should be appreciated that, however, light emitters 30 and circuit board 38 may share a common substrate.

Figure 2:
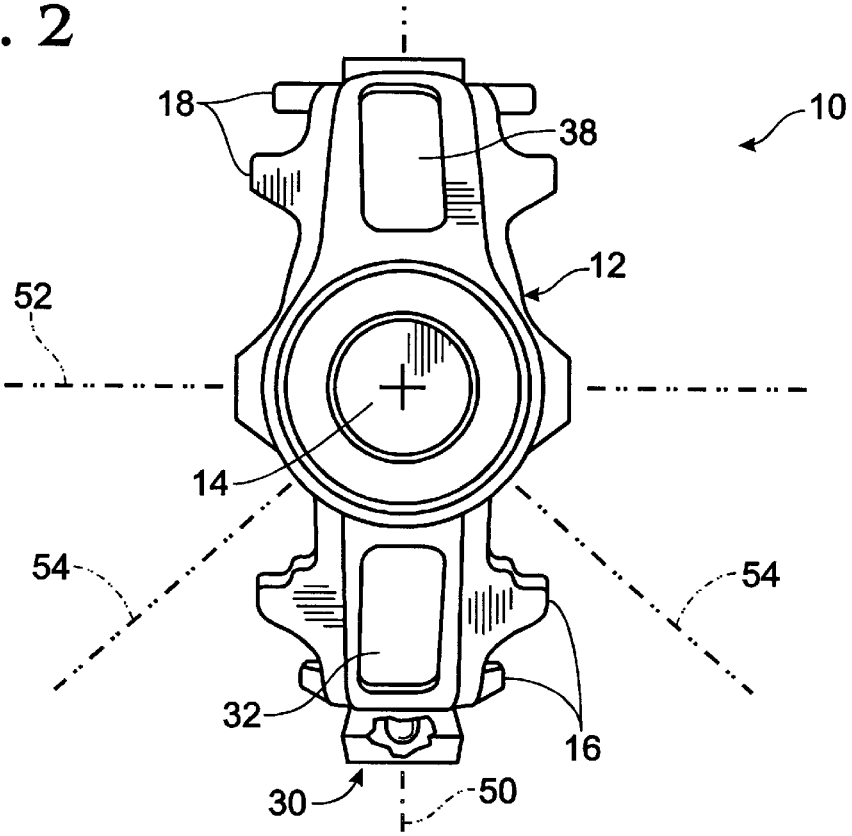
FIG. 2 is a side elevation of the bicycle pedal, depicted in a "off" position.

Referring now to FIG. 2, pedal 10 is depicted in a substantially vertical position, being aligned with a vertical axis 50, as represented by a dash-dot line. The horizontal axis is depicted by dash-double-dot line 52. As depicted in FIG. 2, the pedal is in what is referred to herein as an unloaded condition, meaning that there is no pressure on the pedal, as might be caused by a rider. In such a situation, the pedal frame will rotate such that one of the treads, in this case first tread 16, will rotate to a down position, and will be substantially perpendicular below the other, second tread 18. Gravity activated switch 46 is mounted on circuit board 38 in such a way that the switch will be in an off position when the first tread is in its down position. The switch will remain off until the pedal rotates such that the first tread passes a predetermined angle relative to vertical axis 50, which in the preferred embodiment is approximately 45°, and is represented by dash-triple-dot lines 54. Power supply 32 has sufficient weight to cause pedal frame 12 to rotate, in an unloaded condition, such that first tread 16 is in its down position, and gravity activated switch 46 is in its off position.

Figure 4:
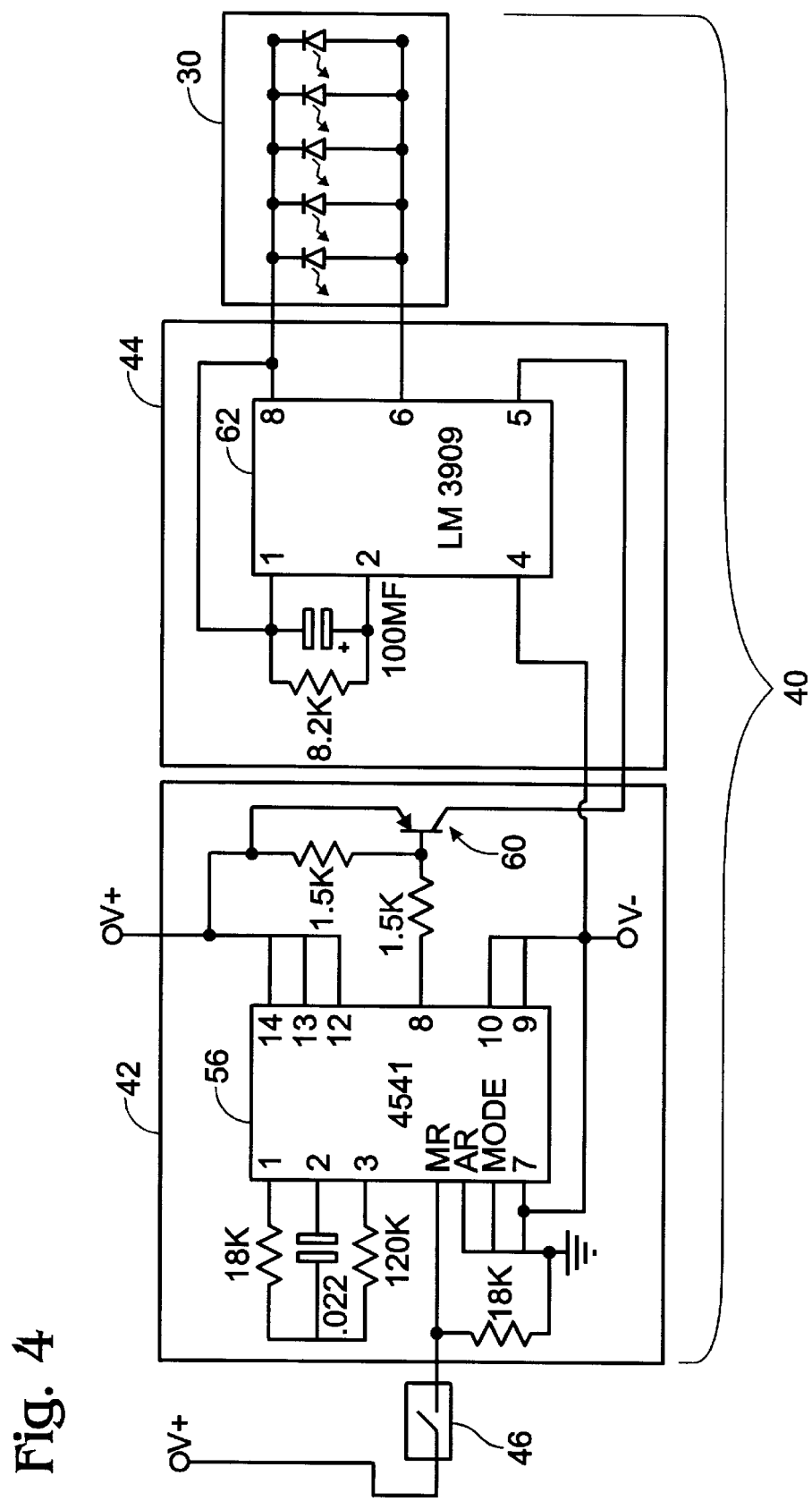
FIG. 4 is a schematic diagram of the lighting mechanism of the invention.

Referring now to FIG. 4, a schematic diagram of light source 40 is depicted. Light source 40 is connected to power supply/weight 32 (not shown in this figure) and appropriate connections thereto are shown. Time-out mechanism 42 may be seen to include an integrated circuit 56 which, as depicted herein, is an RCA CMOS programmable timer, CD4541. The timing mechanism is operable to operate a transistor 60, which as depicted herein, is a PNP transistor, model 2N4403.

Flasher mechanism 44 includes a second integrated circuit 62. In the example shown, the circuit is an LM3909, which is operable to flash light emitter 30. Additional portions of the components on circuit board 38 are depicted using conventional electronic notation and also showing the preferred embodiment of connecting such components to the ICs, the light emitter, power supply, and the gravity activated switch. In some instances, it may be desirable to install another switch in line with gravity activated switch 46 in order to provide a positive off condition for the lighting mechanism, particularly in the case where a rider does not want to operate the lighting mechanism during daylight hours. However, in most configurations, the only switch is gravity activated switch 46, which provides that the light emitter 30 are flashing whenever the bicycle is in use.

Transistor 62 of light source 40 operates as a switch portion of time-out mechanism 42. With switch 46 closed, the timing mechanism in IC 56 turns on and resets to zero. This closes transistor 62 and provides power to IC 62, which then causes the LEDs of light emitter 30 to flash at a predetermined rate. In this case, an 8.2K resistor with a 100MF capacitor provides the RC time constant circuit, which provides approximately 360 flashes per minute. Switch 46 may be closed when pedal frame 12 is in a loaded condition, as when a rider's foot is on the pedal frame, causing first tread 16 to rotate to an up position, such that the first tread is more than 45° off of the vertical. In those locations where flashing lights are prohibited on bicycles, the flash rate may be increased so as to make light emitter 30 appear to be a steady light. This may be accomplished by pre-setting a very high flash rate, or by providing a user-adjustable mechanism for adjusting the flash rate.

When switch 46 is opened, when the pedal is again in its unloaded condition, the power going to the main reset [MR] on IC 56 is interrupted, which begins operation of the timer. Transistor 60 is maintained in a closed position until IC 56 times out, which, with the additional components shown, is approximately 40 seconds. At this point, power to IC 62 is interrupted and the flashing of light emitter 30 ceases. Time out mechanism 42 provides that momentary breaks in the contact of switch 46 will not result in the cessation of light from the lighting mechanism. Such momentary breaks are likely to occur when the bicycle traverse rough terrain, or when the rider stops momentarily, at a stop light or stop sign.

The power supply of the preferred embodiment, a pair of AA batteries, will power the light source of the invention continuously for several months, and should, under normal usage, provide power during all riding hours for a year or more.

Thus, a flashing bicycle pedal has been disclosed. The pedal provides a lighted safety device for a bicycle in the form of a pedal which may be powered for a long period of time without the need to replace batteries in a power supply. The pedal of the invention automatically begins operation when the bicycle is placed in motion, and will automatically shut off within a predetermined amount of time after the bicycle stops.

Although a preferred embodiment of the lighted bicycle pedal has been described herein, it should be appreciated that further modifications and variations may be made thereto without departing from the scope of the invention as defined in the appended claims.

I claim:

1. A lighted bicycle pedal comprising:
    a pedal frame, including a hub and a pair of spaced-apart treads disposed on either side of said hub, wherein said pedal frame is freely rotatable about said hub, and wherein a weight is mounted on said pedal frame to rotate one of said spaced-apart treads to a down position;
    a light source mounted on said pedal frame, including:
        a light emitter for emitting a light beam;
        a flasher mechanism operable to cause said light emitter to flash on and off; and
        a time-out mechanism for controlling said flasher mechanism;
        a power supply for said light source; and
        a gravity-activated switch having an on position and an off position for connecting and disconnecting, respectively, said light source to said power supply.

2. The lighted bicycle pedal of claim 1 wherein said power supply includes a battery located adjacent one of said treads.

3. The lighted bicycle pedal of claim 1 wherein the pedal frame is constructed and arranged such that, when in an unloaded condition, the pedal frame will rotate such that said one tread will be substantially perpendicular below the other tread, and said gravity-activated switch will be in said off position.

4. The lighted bicycle pedal of claim 3 wherein said gravity-activated switch will be in said on position when said one tread is shifted beyond a predetermined angle relative to a vertical position.

5. The lighted bicycle pedal of claim 1 wherein said light emitter includes an array of light-emitting diodes.

6. The lighted bicycle pedal of claim 1 wherein said time out mechanism maintains said light source in an on condition for a predetermined amount of time after said gravity-activated switch is placed in said off position.

7. A lighted bicycle pedal comprising:
    a pedal frame, including a hub, having an axis of rotation therethrough, and a pair of spaced-apart treads disposed on either side of said hub, wherein said pedal frame is freely rotatable about said hub, and wherein a weight is mounted on said pedal frame to rotate one of said spaced-apart treads to a down position; and
    a lighting mechanism, including:
    a light source mounted on said pedal frame, including:
        a light emitter for emitting a light beam;
        a flasher mechanism operable to cause said light emitter to flash on and off; and
        a time-out mechanism for controlling said flasher mechanism;
        a power supply for said light source, wherein said power supply includes a battery located adjacent one of said treads; and
        a gravity-activated switch having an on position and an off position for connecting and disconnecting, respectively, said light source to said power supply, wherein said gravity-activated switch is mounted such that, when said one tread is in a position below said axis of rotation, said gravity-activated switch is in said off position, and when said one tread is in a position beyond a predetermined angle relative to a vertical plane extending through said axis of rotation, said gravity-activated switch is in said on position.

8. The lighted bicycle pedal of claim 7 wherein said light emitter includes an array of light-emitting diodes.

9. The lighted bicycle pedal of claim 7 wherein said time out mechanism maintains said light source in an on condition for a predetermined amount of time after said gravity-activated switch is placed in said off position.

10. A lighted bicycle pedal comprising:

a pedal frame, including a hub, having an axis of rotation therethrough, and a pair of spaced-apart treads disposed on either side of said hub, wherein said pedal frame is freely rotatable about said hub, and wherein a weight is mounted on said pedal frame to rotate one of said spaced-apart treads to a down position when the pedal frame is in an unloaded condition, such that said one tread will be substantially perpendicular below the other tread; and a lighting mechanism, including:

a light source mounted on said pedal frame, including:

a light emitter for emitting a light beam, wherein said light emitter includes an array of light-emitting diodes;

a flasher mechanism operable to cause said light emitter to flash on and off; and a time-out mechanism;

a power supply for said light source including a battery located adjacent said one tread; and a gravity-activated switch having an on position and an off position for connecting and disconnecting, respectively, said light source to said power supply, wherein said gravity-activated switch will be in said on position when said one tread is shifted upwards beyond a predetermined angle relative to the vertical and wherein said time out mechanism maintains said light source in an on condition for a predetermined amount of time after said gravity-activated switch is placed in said off position.

* * * * *